United States Patent

Johnson et al.

[11] Patent Number: 6,053,811
[45] Date of Patent: Apr. 25, 2000

[54] TAILINGS MONITOR FOR AN AGRICULTURAL COMBINE

[75] Inventors: Orlin W. Johnson, Genesco; Dale W. Panoushek, Orion; Eric L. Walker, East Moline; Mark J. Svitak, Colona, all of Ill.; Robert C. Garms, Bettendorf, Iowa

[73] Assignee: Case Corporation, Racine, Wis.

[21] Appl. No.: 08/729,044

[22] Filed: Oct. 10, 1996

[51] Int. Cl.⁷ .................................................. A01F 12/00
[52] U.S. Cl. .............................. 460/6; 460/114; 460/119; 56/10.2 R
[58] Field of Search .................................. 460/11, 12, 13, 460/14, 4, 5, 6, 114, 119, 150; 56/10.2 R, DIG. 15

[56] References Cited

U.S. PATENT DOCUMENTS

| | | | |
|---|---|---|---|
| 4,441,511 | 4/1984 | Schroeder | 460/13 |
| 4,441,513 | 4/1984 | Herwig | 460/13 X |

FOREIGN PATENT DOCUMENTS

| | | | |
|---|---|---|---|
| 6276847 | 10/1994 | Japan | 460/11 |

*Primary Examiner*—Terry Lee Melius
*Attorney, Agent, or Firm*—Mayer, Brown & Platt

[57] ABSTRACT

An apparatus for use in combination with a combine for sensing the volume of tailings exhausted from a cleaning section of the combine and for providing a visual indication to the operator of the effectiveness of combine operation. The combine includes a mobile frame or chassis having an operator compartment arranged toward a forward end thereof. A threshing section of the combine separates grain from crop material delivered thereto. A cleaning section of the combine functions to remove chaff and tailings from the materials received from the threshing section. A tailings section of the combine is arranged to receive incompletely threshed and separated tailings from the cleaning section. The tailings section comprises a tailings conveyor for forcibly moving tailings toward an elevator that moves the tailings to one of the other sections on the combine for recycling. The sensing apparatus of the present invention is arranged proximate to the inlet to the tailings elevator and provides a visual indication in the cab region of the combine of the volume of tailings presented for recycling thus revealing the efficiency of the combine.

22 Claims, 6 Drawing Sheets

TAILINGS MONITOR FOR AN AGRICULTURAL COMBINE

FIELD OF THE INVENTION

The present invention generally relates to agricultural combines or harvesters and, more particularly, to an apparatus for monitoring efficiency of a cleaning process effected by the combine.

BACKGROUND OF THE INVENTION

As an agricultural combine moves across a field, it cuts standing crop and feeds the severed crop materials to a threshing section of the combine. The threshing section of a rotary combine typically includes a threshing cylinder rotatably mounted within a foraminous housing. As the threshing cylinder rotates, the crop materials gently spiral rearwardly and grain is separated from the remainder of the crop materials. Material passing from the threshing cylinder gravitationally passes to a cleaning section of the combine for further processing.

The cleaning section of a rotary combine typically includes a pair of vertically spaced sieves. The sieves are horizontally oscillated causing clean grain to fall therethrough for collection. Normally, at least one of the sieves on the combine includes a plurality of "fingers" that are adjustable relative to each other such that the combine can operate in crop materials having different grains. A blower or fan directs air upwardly and across the sieves to further separate material other than grain from the materials passing from the threshing section.

As will be appreciated, heavier grain material falls through the sieves, is collected, and conveyed to a clean grain bin on the combine. Incompletely threshed grain, however, will not normally pass through the sieves and yet is too heavy to be blown out the rear of the combine with the chaff. These materials, which include grain, are commonly referred to as "tailings". As an example, "tailings" include a fluffy or extremely light weight mixture of grain and mature vegetation on which the grain grows. In the case of wheat, barley and similar crop, tailings include the grain which remains attached to the fragments of the heads, while in the case of corn, tailings include kernels, which remain attached to a piece of cob. To enhance the effectiveness of the combine, the tailings are recycled by returning them to the threshing section for rethreshing as through use of a tailings elevator.

The volume or amount of tailings being recycled depends on the efficiency of the threshing and cleaning sections of the combine. Efficiency of the threshing and cleaning sections is determined by such factors as the clearances provided between the threshing cylinder and housing, threshing speed, the adjustment of the sieves, the output of the cleaning fan, and the volume of crop material input into the combine. If the volume or amount of tailings presented for return is excessive, the combine will tend to "plug up" with grain. That is, as the machine becomes full, the drive system used to transfer rotary power between components begins to slip thus presenting significant operating problems for the operator. When the combine does plug up, however, the operator needs to spend valuable harvesting time returning it to proper operating order. Besides the significant loss of valuable harvesting time, when a combine plugs up serious and costly damage can occur to the combine.

To solve the problem of excessive tailings, the operator can reduce ground speed of the combine, thus presenting less crop material for threshing. As will be appreciated, this is not a feasible solution to the problem because slowing the speed of the combine likewise means less efficiency. Alternatively, the operator can adjust the sieves to reduce the volume of tailings. Sieve adjustment, however, is a subjective process for the operator. That is, the operator can not be sure whether the adjustment chosen is correct before the machine is again plugged up. Alternatively, if the adjustment is incorrect, and although the tailings volume may be reduced, there may be significant contamination of the clean grain as a result of the sieves being incorrectly adjusted. Moreover, adjustment of the sieves is a time consuming process which may or may not be required depending upon several factors including the dryness of the crop material.

Thus, there is a need and a desire for an apparatus which provides a clear and concise visual indication to the operator of combine performance and efficiency during the harvesting process.

SUMMARY OF THE INVENTION

In view of the above, and in accordance with the present invention, there is provided an apparatus for use in combination with a combine for sensing the volume of tailings exhausted from a cleaning section of the combine and for providing a visual indication to the operator of the effectiveness of combine operation. The combine includes a mobile frame or chassis having an operator compartment arranged toward a forward end thereof. A threshing section of the combine separates grain from crop material delivered thereto. A cleaning section of the combine functions to remove chaff and tailings from the materials received from the threshing section. A tailings section of the combine is arranged to receive incompletely threshed and separated tailings from the cleaning section. The tailings section comprises a tailings conveyor for forcibly moving tailings toward an elevator that moves the tailings to one of the other sections on the combine for recycling. The sensing apparatus of the present invention is arranged proximate to the inlet to the tailings elevator and provides a visual indication in the cab region of the combine of the volume of tailings presented for recycling thus revealing the efficiency of the combine.

The threshing section, cleaning section and tailings section are enclosed within a walled housing of the combine. The tailings elevator is arranged outside of the walled housing. The tailings conveyor, preferably in the form of an auger, forcibly moves tailings to one side of the walled housing and introduces the tailings to the elevator. To facilitate transference of material from the housing of the combine to the tailings elevator, a tube-like housing surrounds that axial portion of the tailings conveyor positioned outside of the walled housing and extending to the elevator. Preferably, the sensor apparatus of the present invention is mounted on the tube-like housing and measures the volume of tailings passing through the tube-housing to the elevator.

In a preferred form of the invention, the sensing apparatus comprises an actuator mounted adjacent the tailings auger. The actuator of the sensing apparatus is displacable from a predetermined position as a function of the volume of tailings passing to the tailings elevator. The sensing apparatus provides an output signal representative of the displacement of the actuator relative its predetermined position. The output signal of the sensing apparatus operates a display to provide a visual indication of the operational performance or efficiency of the combine. In a most preferred form of the invention, the display includes a bar graph which functions proportionately to the volume of tailings passing to the tailings elevator.

In a most preferred form of the invention, the actuator of the sensing apparatus includes a pivotal rod mounted adjacent the periphery of the auger. The tailings forcibly propelled by the auger towards the elevator pivotally and positively displaces the rod from a predetermined position and such displacement of the actuator is monitored by the sensing apparatus. Positive displacement of the rod and, thus, the output signal produced by the sensing apparatus is proportional to the volume of material moving toward the tailings elevator. Accordingly, the display, which is driven by the output signal from the sensing apparatus, provides a concise visual indication of the volume of tailings presented to the tailings elevator thereby yielding a visual indication of combine operating efficiency.

As the combine is driven across a field, the operator can quickly and easily evaluate the performance and efficiency of the combine as a function of the display in the cab region. That is, the operator can quickly assess efficiency of the combine and adjust its performance accordingly prior to the combine plugging up. Thus, the apparatus of the present invention is economical, is retrofittable to existing combines, and is relatively simple in operation thus lending itself to wide spread application for agricultural combines.

These and other objects, aims and advantages of the present invention will become readily apparent from the following detailed description, appended claims and accompanying drawings.

DETAILED DESCRIPTION OF THE PRESENT INVENTION

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Figure 1:
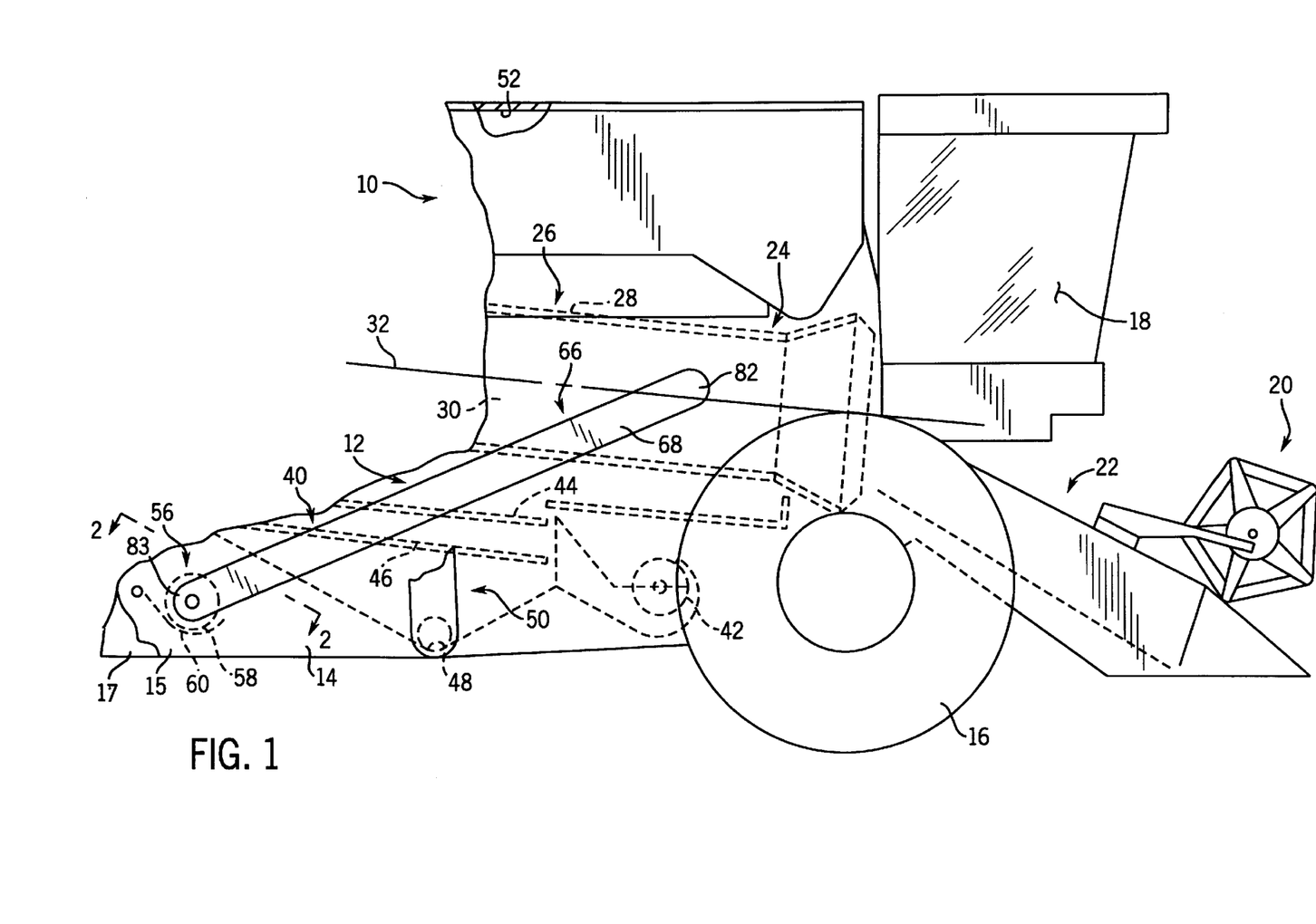
FIG. 1 is fragmentary side elevational view of an agricultural combine embodying principles of the present invention.

Referring now to the drawings, wherein like reference numerals refer to like parts throughout the several views, there is shown in FIG. 1 a self-propelled agricultural harvester or combine 10. The combine 10 is preferably of the type marketed by the assignee herein under Model No. 2100 Series but it should be appreciated that the teachings of the present invention are equally applicable to other forms of agricultural harvesters without departing or detracting from the spirit and scope of the present invention. Combine 10 includes a body or housing 12 carried on a frame or a chassis 14 which is supported for movement across a field by wheels 16. The housing 12 includes parallel side walls 15 and 17 defining an enclosure therebetween. As is conventional, the combine is powered by an engine (not shown) and controlled from an enclosed operator station 18 arranged toward a forward end of the chassis or frame 14.

As is conventional, a crop harvesting apparatus or header 20 and an infeed mechanism 22 are arranged toward a forward end of the combine beneath the cab enclosure 18. As is well known, the harvesting apparatus or header 20 cuts and harvests the crop materials and feeds the severed crop materials to the infeed mechanism 22 as the combine is driven across a field. The infeed mechanism 22 receives crop materials from the header assembly 20 and directs them rearwardly to a threshing section 24 on the combine 10.

In the illustrated form of the invention, the threshing section 24 is mounted within the housing 12 between the walls 15 and 17 and includes a rotor assembly 26. The rotor assembly 26 is preferably configured as a single unit that threshes and separates the crop materials presented thereto into grain and material other than grain. As schematically represented in FIG. 1, the rotor assembly 26 comprises an elongated and generally cylindrical member 28 in the form of a rotor casing or cage having a rotor 30 mounted for rotation therein and about a fixed axis 32. Between the upstream and downstream ends of the rotor assembly 26, crop material is threshed repeatedly, but gently, as it spirals around the single large diameter rotor 30 and grain is permitted to pass through the foraminous threshing cage 28. In a conventional manner, suitable instrumentalities mounted on the periphery of the rotor 30 cooperate respectively with the rotor casing or cage 28 to thresh the crop materials such that most of the grain will be separated and propelled downwardly through the housing.

Threshed materials passing outwardly from the rotor assembly 26 gravitationally move and are received at a cleaning section 40 also arranged within the body or housing 12 of combine 10. The purpose of the cleaning section 40 is to remove chaff and tailings from the threshed materials received from the rotor assembly 26.

As is well known, the cleaning section 40 includes a cleaning fan 42 and preferably two cleaning sieves 44 and 46. Each sieve 44, 46 is generally rectangular in configuration and extends in a fore-and-aft direction beneath the threshing section 24 ad between the side walls 15, 17 of housing 12. During operation of the combine, the cleaning fan 42 directs a forceful stream of air upwardly through and across the top surface of the generally rectangular sieves 44 and 46. As the materials fall from the rotor assembly, chaff, tailings and material other than grain is blown rearwardly under the influence of the cleaning fan 42. The chaff and other light residue materials is entrained in the air stream of fan 42 and blown out the rear end of the combine.

To enhance versatility of the machine, and as is well known in the art, one of the sieves 44, 46 preferably includes a plurality of adjustable fingers (not shown) arranged in a well known and cooperative relationship relative to each other such that the permeability of the sieve is adjustable depending upon the crop being harvested. Clean grain gravitationally passes through the sieves 44, 46 and is collected in a clean grain collection area 48. A clean grain elevator 50 moves the clean grain from the area 48 to a clean grain storage bin 52 preferably mounted on the frame or chassis 14 of the harvester.

Tailings, including grain which is only partly threshed, will not pass through the sieves 44,46. Because they are too heavy to be blown out with the chaff under the influence of the cleaning fan 42, the tailings pass from the cleaning section 40 to a tailings section 56 on the combine. The purpose of the tailings section 56 is to return tailings to one of the threshing section 24 or cleaning section 40 for rethreshing and, thus, recapturing of the grain carried with the tailings.

Figure 2:
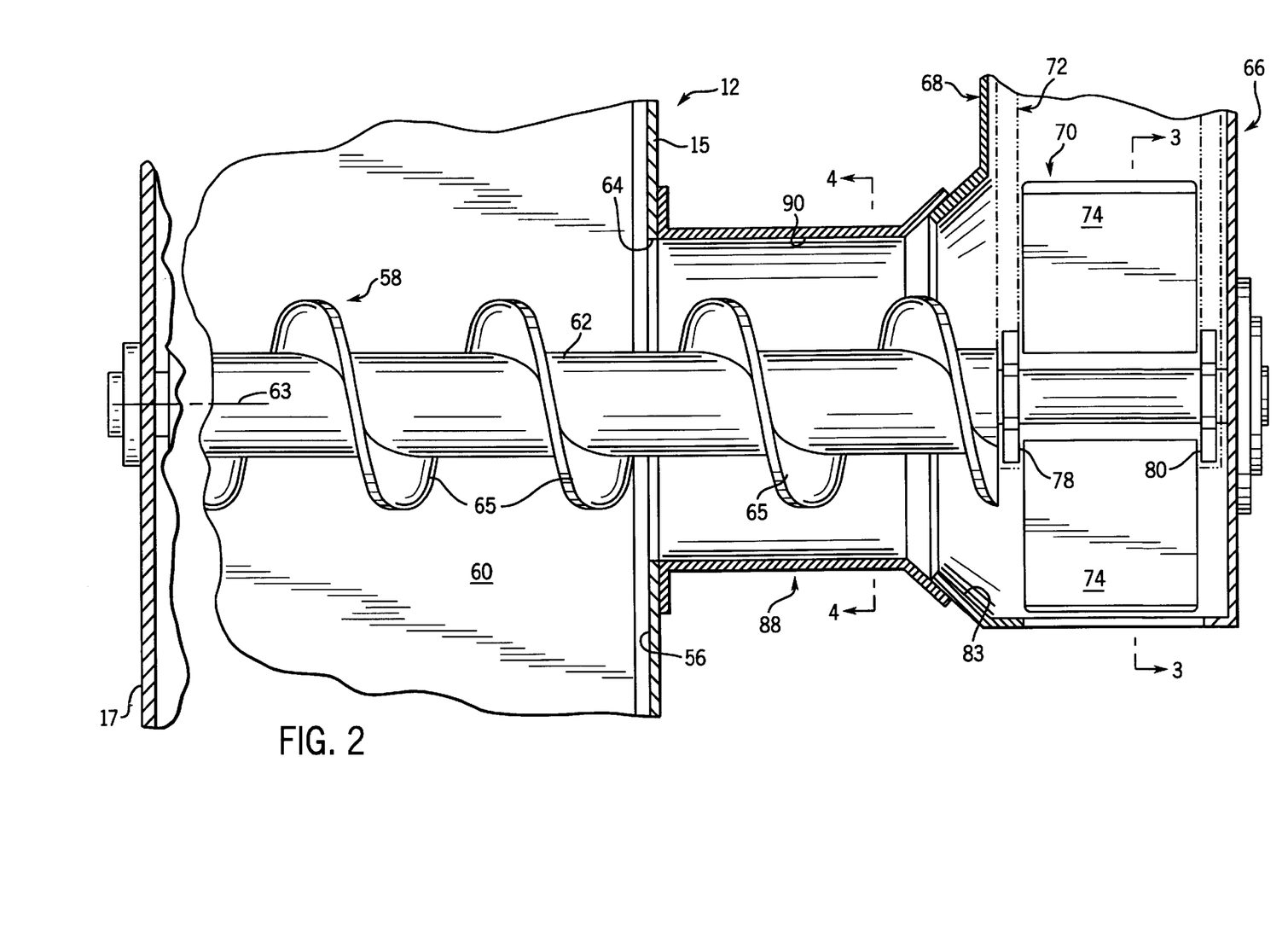
FIG. 2 is an enlarged sectional view taken along line 2—2 of FIG. 1.

As shown in FIGS. 1 and 2, the tailings section 56 of the combine is arranged in predetermined relation relative to the threshing and cleaning sections 24 and 40, respectively, and includes a tailings conveyor 58 arranged in combination with a tailings pan 60. In a preferred form, the tailings conveyor 58 includes an elongated driven auger 62 that rotates about an axis 63 (FIG. 2) and extends transversely across the entire width of the sieves 44 and 46 (FIG. 1) in generally parallel relation with and toward a rear edge thereof. The auger 62 is mounted adjacent and in operative relation with the tailings trough or pan 60 to move the tailings toward one side wall of the combine. As is well known, the auger 62 includes flightings 65 extending along the axial length thereof for engaging and moving the tailings in one direction generally parallel with the axis 63 of the auger 62 and toward one side of the housing 12.

Figure 3:
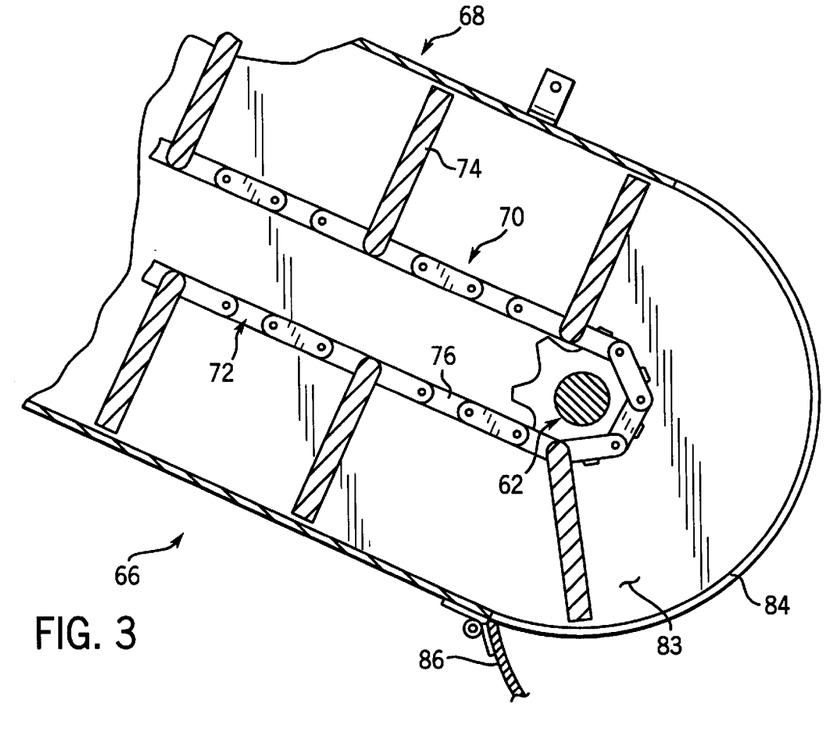
FIG. 3 is a sectional view taken along line 3—3 of FIG. 2.

Turning to FIG. 2, the elongated conveyor 58 axially extends beyond the housing 12 through an opening or hole 64 defined in that side wall of the housing toward which the tailings are moved under the influence of conveyor 58. The tailings are operatively delivered by the conveyor 58 to a tailings conveyor or elevator 66. As shown is FIGS. 1 and 2, the tailings elevator 66 is mounted outside or exteriorly of housing 12. As shown in FIGS. 2 and 3, housing 68 operates in combination with a conveyor 70 for moving the tailings from the exhaust end of the auger 62 to one of the threshing section 24 or cleaning section 40.

As shown in FIGS. 2 and 3, housing 68 of elevator 66 is a generally rectangular, preferably metal member and the conveyor 70 includes a conventional chain and slat conveyor system 72. The conveyor system 72 includes a continuous chain or drive link arrangement extending lengthwise through the housing 68 of elevator 66. Tailings paddles 74 are secured between and move with chains 76. As well known in the art, opposite ends of the chains 76 are entrained in driving relation about a of pair laterally spaced sprockets 78 and 80. The sprockets 78, 80 at the lower end of the conveyor 70 are preferably driven with and by the auger 62. The spaces between the paddles 74 provide compartments for transporting tailings to an exhaust end 82 (FIG. 1) of the tailings conveyor 66.

As shown in FIG. 3, an inlet end 83 of housing 68 of tailings elevator 66 is preferably provided with an enlarged opening 84 providing access to the exhaust end of the auger 62. Preferably, opening 84 is closed by a door 86 movable between open and closed positions relative to the opening 84.

Figure 4:
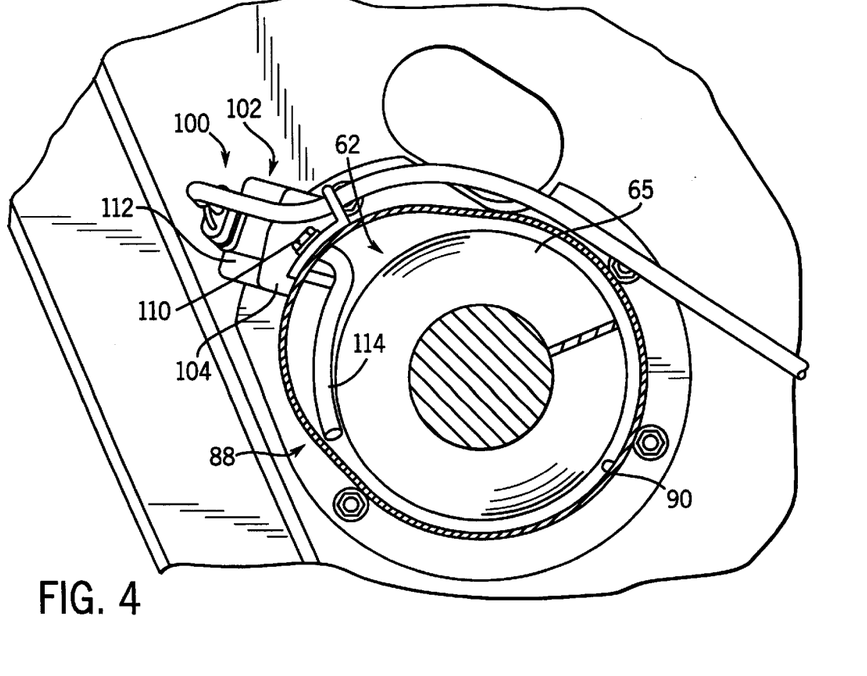
FIG. 4 is a sectional view taken along line 4—4 of FIG. 2.
Figure 5:
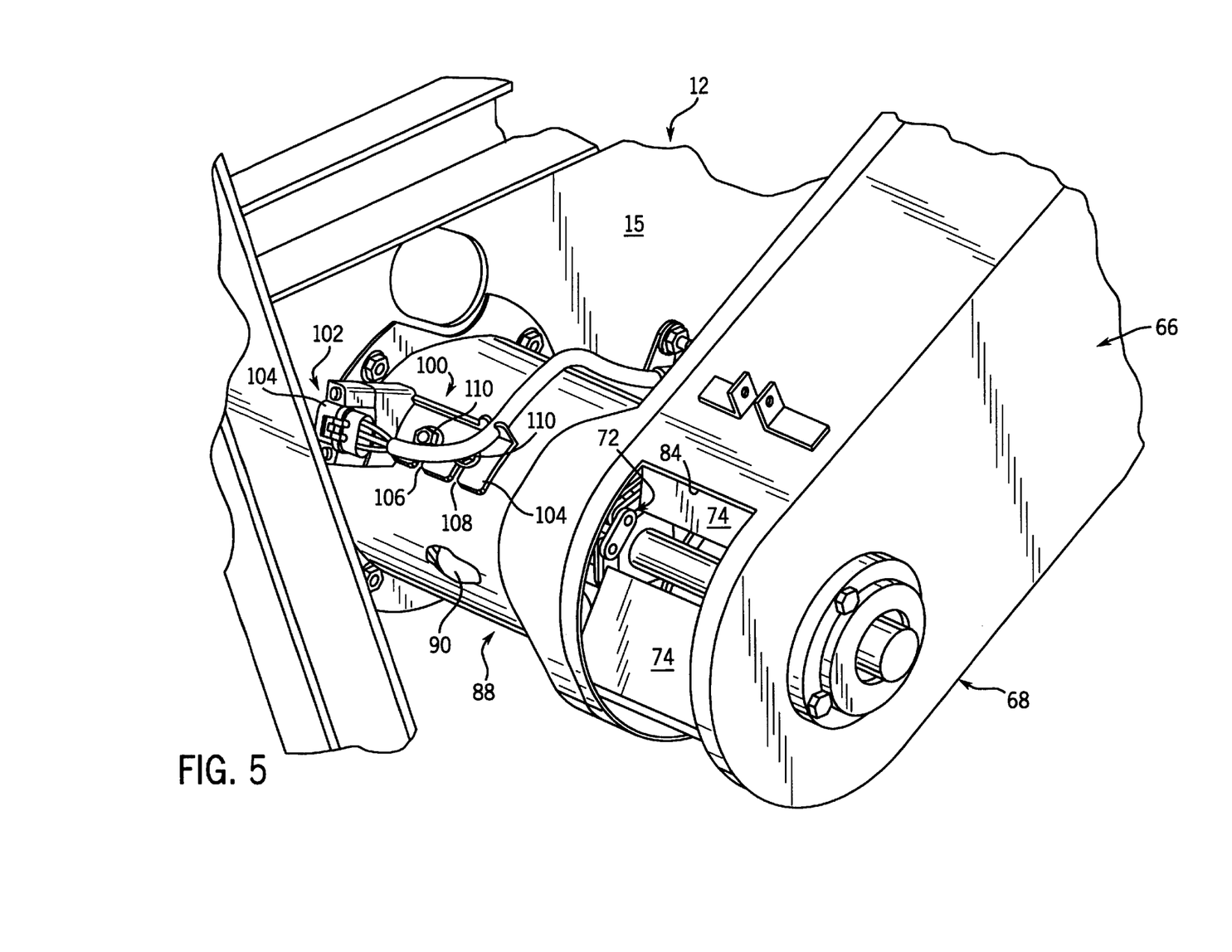
FIG. 5 is a perspective view of the present invention shown mounted to an agricultural combine as illustrated in FIG. 1.

As shown in FIGS. 2, 4 and 5, to facilitate transference of tailings material between housing 12 and elevator 66, a tube-like enclosure 88 is arranged in surrounding relation and extends axially along a lengthwise portion of the tailings conveyor 58. As shown, enclosure 88 defines an enclosed passage 90 that opens, at one end, to that side of the housing 12 to which tailings are directed by the tailings conveyor 58 and, at an opposite end, to the inlet end 83 of the tailings elevator 66. As shown is FIGS. 4 and 5, the tube-like enclosure 88 has a generally cylindrical-like configuration with opposed ends joined to housing 12 and elevator housing 68.

The tailings section 56 of combine 10 further includes an apparatus 100 for sensing and displaying to the combine operator the volume of tailings being conveyed for reprocessing. That is, the apparatus 100 of the present invention provides a visual indication of the efficiency of the threshing and cleaning sections 24 and 40 respectively, of the combine.

The auger trough or tailings pan 60 converges into a generally round tube-like structure 88. The convergence creates a restriction that limits the maximum capacity of the tailings elevator 66. Testing has revealed that measuring the volume of tailings material at this location is the best way to measure the capacity of the combine to handle tailings for rethreshing purposes. According to the present invention, and as shown in FIG. 5, the sensing or monitoring apparatus 100 is preferably arranged in the area of passage 90.

Figure 6:
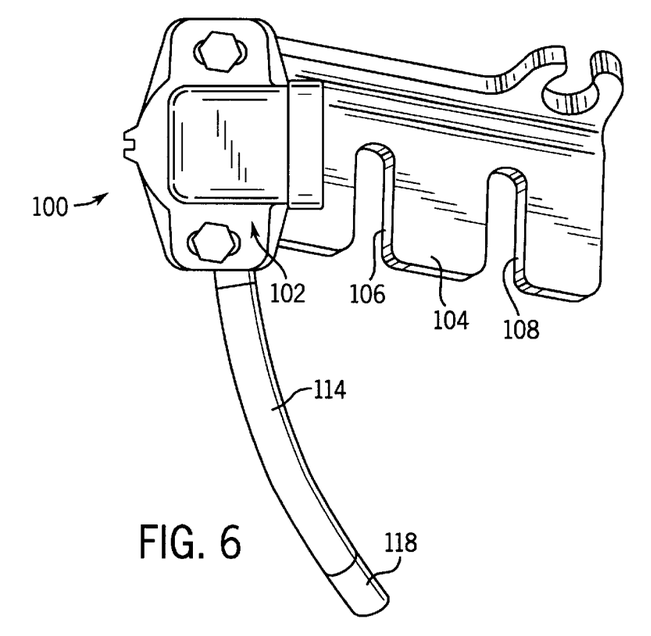
FIG. 6 is an elevational view of the apparatus of the present invention shown disassembled from the combine.

As will be described in detail below, the sensing apparatus 100 of the present invention provides a visual indication of the operating efficiency of the combine 10 to the operator. The sensing apparatus 100 includes a sensor or monitor assembly 102 for positively measuring the volume or flow of tailings moving to the tailings elevator 66 for rethreshing and for providing an output signal proportional thereto. In the illustrated embodiment, a housing 104 is provided for mounting the sensor or monitor assembly 102 to the tube-like enclosure 88. As shown in FIG. 6, housing 104 preferably defines a pair of slotted openings 106 and 108 for allowing suitable fasteners 110 (FIG. 5) to extend through and secure the housing 104 to the tube-like enclosure 88.

Figure 7:
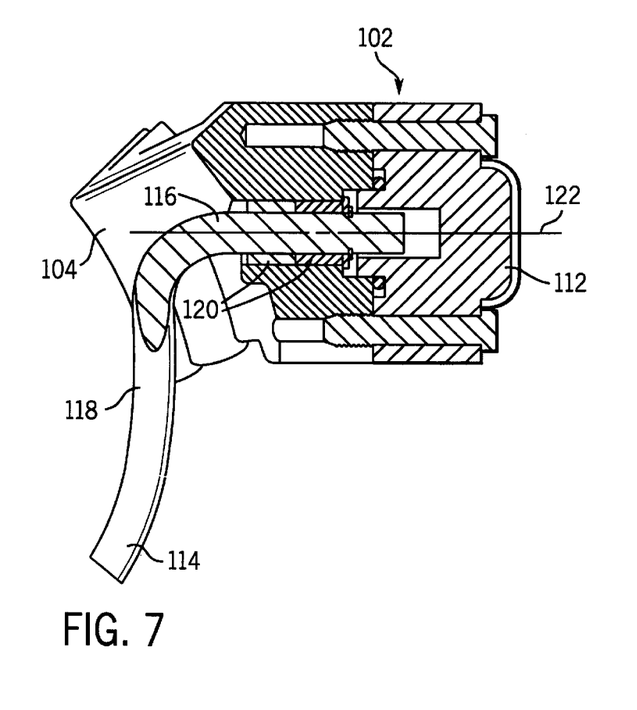
FIG. 7 is a fragmentary sectional view taken along line 7—7 of FIG. 6.

As shown in FIGS. 4, 6 and 7, the sensing apparatus 102 includes a monitor 112 secured to the housing 104 and an actuator 114 operably associated with the monitor or sensor 112 and configured to be positioned, preferably within the enclosed passage 90 in close proximity to periphery of the flightings 65 on auger 62. The monitor 112 may be of a potentiometer type sold by Duncan Electronics, a division of BEI Sensors and Systems Company of Tustin, Calif. under Model No. 9810-678. Suffice it to say, however, any apparatus capable of measuring displacement of the actuator 114 from a predetermined position and developing an output signal as a function of the displacement of the actuator 114 would be equally applicable to the present invention.

In the illustrated form of the invention, and turning to FIG. 7, the actuator 114 has a generally L-shaped configuration including angularly offset leg portions 116 and 118. The leg portion 116 of actuator 114 is operably associated with the sensor 112. As shown, the leg portion 116 of actuator 114 extends through and is journalled by the housing 104. As shown in FIG. 7, housing 104 preferably includes suitable antifriction bearings 120 for reducing frictional surface engagement between leg portion 116 of actuator 114 and housing 104. The other leg portion 118 of actuator 114 preferably has a curvilinear configuration that generally proximates the peripheral surface of the auger flightings 65. As shown in FIG. 6, the leg portion 118 of actuator 114 is furthermore shaped in a curvilinear fashion in the direction of movement of the tailings toward the elevator housing 68. In the illustrated form of the invention, the actuator 114 rotates about an axis 122 defined by leg section 116 in response to the movement of tailings along the tailings conveyor 58.

Figure 8:
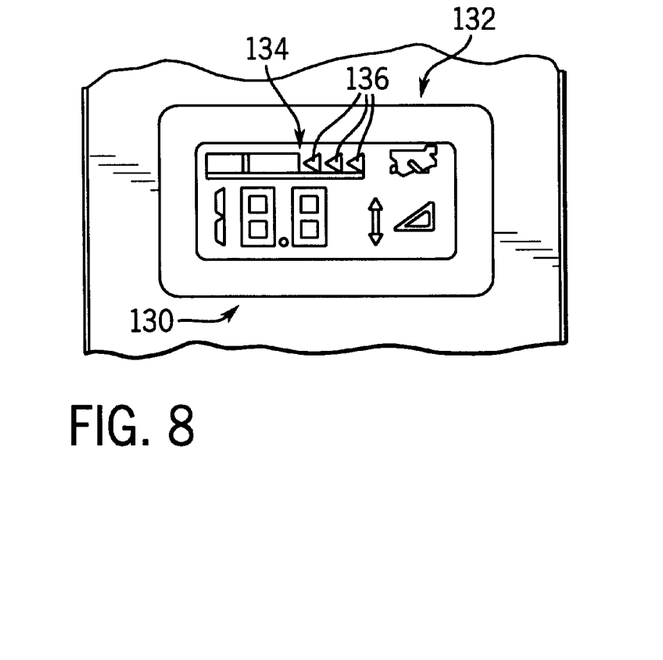
FIG. 8 is a schematic representation of a display forming part of the present invention.

The sensing apparatus 100 of the present invention further includes a visual indicator 130 for providing the operator with a quick and readily available visual representation of the volume of tailings passing through the tailings elevator 66 and, thus, providing a visual indication of the efficiency of the combine. In the illustrated embodiment, the visual indicator 130 is arranged in the cab region or operator station 18 of the combine 10 and includes a display 132 for graphically illustrating the volume of tailings being represented for further processing. The display 132 can take many forms for indicating the volume of tailings. Preferably, the display 132 is in the form of a bar graph 134 which increases proportionately as a function of the displacement of the actuator 118 from its predetermined position. As shown in FIG. 8, the bar graph 134 is preferably comprised of a series of illuminable elements 136 arranged in predetermined relation relative to each other.

Figure 9:
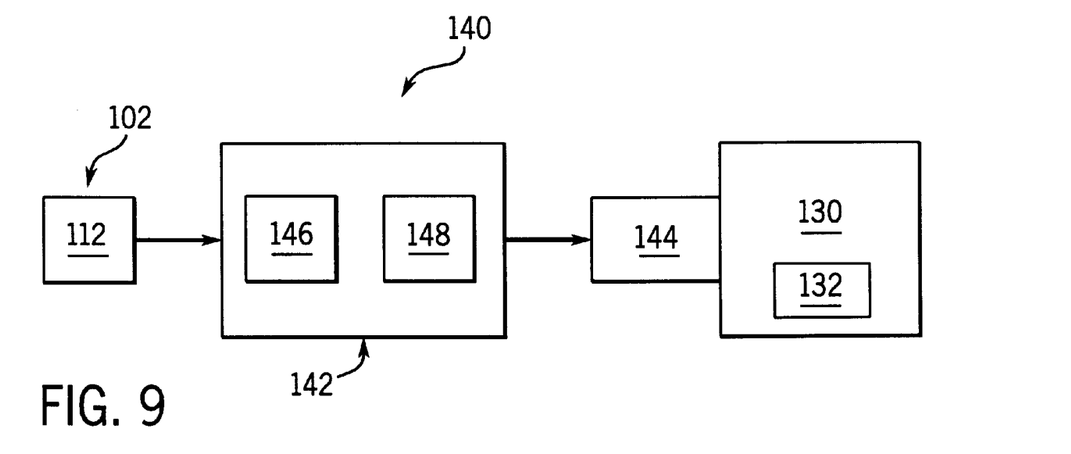
FIG. 9 is a block diagram of electrical circuitry associated with the present invention.

As shown in FIG. 9, suitable driver circuitry 140 interconnects the sensor or monitor 112 of the sensing apparatus 102 with the visual indicator 130 to operate the display 132 in a manner yielding a visual representation of the volume of tailings being presented for rethreshing and thereby the efficiency of the combine. As will be appreciated, circuitry 140 operates the display 132 in response to the output signals received from the sensor 112 and in manner yielding a visual indication of the volume of tailings being presented for reprocessing. As mentioned, the output signal of the sensor 112 is proportional to the displacement of the actuator 114 thereby progressively illuminating adjacent elements 136 of the display 132 in proportion to the volume of tailings being presented for reprocessing.

As shown in FIG. 9, circuitry 140 includes signal conditioning circuitry 142 for reducing fluctuations in the output signal received for the sensor 112 of sensor assembly 102. Preferably, the signal conditioning circuitry 140 averages the signal received from the sensor 112 over a predetermined period of time. As shown, the signal conditioning circuitry 140 is connected to a conventional driver 144 operably associated with the visual indicator 130 and includes circuitry such as a programmed microchip 146 and a filtering apparatus 148.

During operation of the harvester, the header 20 reaps and rearwardly advances the crop material to the threshing section 24 of the combine 10. Materials are passed outwardly from the threshing section 24 toward the cleaning section 40. As the materials fall from the threshing section 24, the air directed by the cleaning fan separates the chaff from the heavier grain. Sieves 44 and 46 furthermore facilitate cleaning of the materials received from the threshing section 24. Because the tailings are heavier they are not typically blown out the rear of the machine with the chaff. Instead, the tailings are moved to the tailing section 56 whereat the tailings conveyor moves such tailings through the hole or opening 64 in the housing 12 to the tailings elevator 66 for reprocessing so as to recapture the grain carried therewith.

The sensing apparatus 100 of the present invention monitors the flow of tailings into the tailings elevator and produces an output signal as function of the volume of tailings moving past the sensor 112. In the illustrated form of the invention, and when the machine or combine is not being operated, the actuator 114 of the sensing assembly 102 is disposed in a predetermined position indicative of little or no tailings being advanced by the conveyor 58 toward the tailings elevator 66. During operation of the combine, however, the conveyor 58 moves the tailings toward one side of the housing and to the elevator 66 for rethreshing. Because of its proximate disposition relative to the flightings 65 on the auger 62, the actuator 114 of the sensing assembly 102 is positively displaced from its predetermined position by the tailings moving with the auger 62. The sensor or monitor 112 associated with the sensing assembly 102 measures the positive displacement of the actuator 114 relative its predetermined position and produces an output signal proportional to the extent the actuator 114 is positively displaced from its predetermined position.

The signal from the sensor 112 is delivered by the driver circuitry 140 which preferably serves to average the signal over a predetermined period of time thereby inhibiting any signal fluctuations that may be produced from providing wrong readings or indications on the visual indicator 130. As will be appreciated, the signals received from the sensor 112 of the sensing apparatus 102 serve to drive the visual indicator 130 thereby yielding a visual display indicative of the performance characteristics of the combine 10. The graphical display 132 preferably chosen for the visual indicator 130 increases proportionately to the volume of tailings being moved by the tailings elevator for rethreshing thus providing the operator with a constant indication of the efficiency of the combine and whether the settings of those mechanisms associated with the threshing section 24 or cleaning section 40 need to be reset or adjusted. Thus, the present invention has the advantages of positively monitoring the volume of tailings being returned for rethreshing as well as continually informing the operator on the display 130 of the efficiency of the combine depending upon the percentage of elements 136 illuminated.

The tailings sensing apparatus of the present invention provides a simple and effective mechanism for positively monitoring the efficiency of an agricultural combine. The sensing system of the present invention eliminates the need for visual sensors that are subject to scratching in an environment laden with dust, dirt and other abrasive elements. Moreover, the present invention provides a clear indication to the operator whether the threshing and cleaning sections of the combine are operating at their peak efficiency thereby allowing the harvesting process to be enhanced without concern over the machine plugging up and causing significant downtime and possibly savings repair costs.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An agricultural combine having a frame, a threshing section provided on the frame to separate grain from crop materials delivered to said threshing section, a cleaning section in communication with the threshing section to remove chaff and the like from material received from the threshing section, and a tailings section wherein incompletely threshed and separated materials are received as tailings from the cleaning section, said tailings section comprising a tailings conveyor to convey the tailings toward an elevator that moves said tailings to one of said threshing and cleaning sections for recycling, said tailings section further including an apparatus to sense the volume of tailings in said tailings conveyor being directed to said elevator and a display responsive to said apparatus to provide an indication of the volume of said tailings being directed to said elevator.

2. The combine according to claim 1 further including a walled housing in which the threshing section, the cleaning section and the tailings conveyor are arranged in predetermined relationship relative to each other, wherein said elevator is mounted outside of said walled housing.

3. The combine according to claim 2 further including a tailings pan in communication with the cleaning section to receive tailings from said cleaning section, and wherein said tailings conveyor includes a rotatable auger in communication with said tailings pan and extending axially into operable relationship with said elevator.

4. The combine according to claim 3 further including a tube-like enclosure extending between said walled housing and said elevator with at least a portion of the tailings conveyor located therein.

5. The combine according to claim 4 wherein said apparatus senses the volume of tailings passing through said tube-like enclosure to said elevator.

6. The combine according to claim 1 wherein said display provides a graphical representation of the volume of tailings being conveyed by the tailings conveyor toward said elevator as sensed by the apparatus.

7. The combine according to claim 1 wherein the display provides a representation of the volume of tailings being conveyed by the tailings conveyor to the elevator as averaged over a predetermined period of time.

8. A grain combine comprising a self-propelled chassis having an operator compartment, a threshing assembly provided on the chassis to thresh grain from crop, a sieve assembly in communication with the threshing assembly to separate chaff and tailings from threshed materials received from said threshing assembly, a tailings conveyor in communication with the sieve assembly to convey the tailings from the sieve assembly to a tailings elevator for recycling to one of the threshing assembly and the sieve assembly, an apparatus to measure the tailings being conveyed by said tailings conveyor, and a display arranged in the operator compartment and responsive to said apparatus to provide an indication of the measure of tailings being conveyed by the tailings conveyor and wherein the apparatus includes an actuator positioned to positively engage the tailings being conveyed by the tailings conveyor to the tailings elevator.

9. The grain combine according to claim 8 wherein the sieve assembly includes a set of adjustable sieves and said display further provides a graphical representation of the adjustment of said sieve assembly.

10. The grain combine according to claim 8 further including a walled housing in which the threshing assembly, the sieve assembly and the tailings conveyor are arranged in predetermined relationship relative to each other, wherein said tailings elevator is arranged outside of said walled housing with a tube-like enclosure interconnecting the tailings elevator and the tailings conveyor.

11. The grain combine according to claim 10 wherein the apparatus is positioned proximate to said tube-like enclosure and includes an actuator displaceable from a predetermined position by positive engagement with the tailings so as to measure the tailings as a function of the displacement of the actuator, the apparatus providing an output signal representative of the displacement of said actuator relative said predetermined position.

12. The grain combine according to claim 11 wherein the display is responsive to the output signal of the apparatus to provide a visual indication of the operational performance of the sieve assembly.

13. The combine according to claim 8 wherein the actuator is displaceable, the tailings measured by the apparatus corresponding to the displacement of the actuator.

14. A self-propelled agricultural combine comprising a chassis, a grain cleaning and separating assembly mounted on the chassis to thresh crop material received by the combine, a cleaning system in material receiving relation relative to said grain cleaning and separating assembly to further separate grain from chaff and tailings, a tailings pan in communication with the cleaning system to receive the tailings from the cleaning system, an elongated auger mounted in combination with the tailings pan to convey said tailings to a grain rethreshing elevator operative to move the tailings received from said auger to a location for further cleaning and separating, an apparatus to sense the volume of tailings presented to said grain rethreshing elevator wherein the apparatus includes an actuator arranged proximate a peripheral edge of said auger prior to the grain rethreshing elevator, said actuator being displaceable from a predetermined position in response to the volume of tailings moving therepast, and a display responsive to the displacement of said actuator relative said predetermined position to provide a visual indication of the sensed volume of tailings and further including a flow-restrictive passage between the tailings pan and the grain rethreshing elevator, the passage having an infeed side and an outfeed side proximate the elevator, the apparatus being positioned proximate the infeed side of the flow-restrictive passage to sense the volume of tailings passing therethrough.

15. A self-propelled agricultural combine comprising a chassis, a grain cleaning and separating assembly mounted on the chassis to thresh crop material received by the combine, a cleaning system in material receiving relation relative to said grain cleaning and separating assembly to further separate grain from chaff and tailings, a tailings pan in communication with the cleaning system to receive the tailings from the cleaning system, an elongated auger mounted in combination with the tailings pan to convey said tailings to a grain rethreshing elevator operative to move the tailings received from said auger to a location for further cleaning and separating, an apparatus to sense the volume of tailings presented to said grain rethreshing elevator wherein the apparatus includes an actuator arranged proximate a peripheral edge of said auger prior to the grain rethreshing elevator, said actuator being displaceable from a predetermined position in response to the volume of tailings moving therepast, and a display responsive to the displacement of said actuator relative said predetermined position to provide a visual indication of the sensed volume of tailings; and wherein the apparatus includes an actuator positioned to positively engage the volume of tailings being conveyed by the tailings conveyor to the elevator.

16. The combine according to claim 15 wherein the actuator is displaceable, the volume of tailings sensed by the apparatus corresponding to the displacement of the actuator.

17. An agricultural combine having a frame, a threshing section provided on the frame to separate grain from crop materials delivered to said threshing section, a cleaning section in communication with the threshing section to remove chaff and the like from material received from the threshing section, and a tailings section wherein incompletely threshed and separated materials are received as tailings from the cleaning section, said tailings section comprising a tailings conveyor to convey the tailings toward an elevator that moves said tailings to one of said threshing and cleaning sections for recycling, said tailings section further including an apparatus to sense the volume of tailings being directed to said elevator and a display responsive to said apparatus to provide an indication of the volume of said tailings being directed to said elevator and further including a flow-restrictive passage between the tailings conveyor and the elevator, the passage having an infeed side and an outfeed side proximate the elevator, the apparatus being positioned proximate the infeed side of the flow-restrictive passage to sense the volume of tailings passing therethrough.

18. The combine according to claim 17 wherein the apparatus includes a displaceable actuator extending into the flow-restrictive passage to positively engage the volume of tailings passing therethrough, the volume of tailings sensed by the apparatus corresponding to the displacement of the actuator.

19. The combine according to claim 18 wherein said tailings conveyor includes a rotatably driven auger provided in communication with said flow-restrictive passage.

20. The combine according to claim 19 wherein the actuator includes a curvilinear leg portion corresponding to and located proximate a periphery of the auger.

21. A grain combine comprising a self-propelled chassis having an operator compartment, a threshing assembly provided on the chassis to thresh grain from crop, a sieve assembly in communication with the threshing assembly to separate chaff and tailings from threshed materials received from said threshing assembly, a tailings conveyor in communication with the sieve assembly to convey the tailings from the sieve assembly to a tailings elevator for recycling to one of the threshing assembly and the sieve assembly, an apparatus to measure the tailings being conveyed by said tailings conveyor, and a display arranged in the operator compartment and responsive to said apparatus to provide an indication of the measure of tailings being conveyed by the tailings conveyor and further including a flow-restrictive passage between the tailings conveyor and the tailings elevator, the passage having an infeed side and an outfeed side proximate the evevator, the apparatus being positioned proximate the infeed side of the flow-restrictive passage to measure the tailings passing therethrough.

22. The combine according to claim 21 wherein the apparatus includes a displaceable actuator extending into the flow-restrictive passage to positively engage the tailings passing therethrough, the tailings measured by the apparatus corresponding to the displacement of the actuator.

* * * * *